United States Patent
Lin et al.

(10) Patent No.: US 8,576,187 B2
(45) Date of Patent: Nov. 5, 2013

(54) TOUCH SENSING DEVICE HAVING A PLURALITY OF GATE DRIVERS ON ARRAY ADJACENT TO EACH OF A PLURALITY OF TOUCH MODULES

(75) Inventors: Ku-Liang Lin, Hsinchu County (TW); Wen-Kai Shih, Hsinchu County (TW); Sheng-Liang Hsieh, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 344 days.

(21) Appl. No.: 12/941,611

(22) Filed: Nov. 8, 2010

(65) Prior Publication Data

US 2012/0113016 A1    May 10, 2012

(51) Int. Cl.
*G06F 3/041*    (2006.01)
*G09G 3/36*    (2006.01)

(52) U.S. Cl.
USPC .......................................... 345/173; 345/100

(58) Field of Classification Search
USPC ........................................... 345/98–100, 173
See application file for complete search history.

(56) References Cited

U.S. PATENT DOCUMENTS

| | | | |
|---|---|---|---|
| 2007/0070020 A1* | 3/2007 | Edo et al. ...................... | 345/100 |
| 2010/0238122 A1* | 9/2010 | Chang et al. .................. | 345/173 |
| 2010/0327955 A1* | 12/2010 | Umezaki ....................... | 327/520 |
| 2011/0075009 A1* | 3/2011 | Border et al. ................. | 348/317 |

* cited by examiner

*Primary Examiner* — Chanh Nguyen
*Assistant Examiner* — Long D Pham
(74) *Attorney, Agent, or Firm* — Morris Manning & Martin LLP; Tim Tingkang Xia, Esq.

(57) ABSTRACT

The present invention, in one aspect, relates to a touch sensing device. In one embodiment, the touch sensing device includes a plurality of touch modules spatially arranged in a form of a matrix having a plurality of rows and a plurality of columns, and a plurality of GOAs configured to receive a clock signal. Each GOA has an input for receiving a driving signal and an output for responsively outputting a delayed driving signal by a time interval to a respective touch module. The plurality of GOAs is spatially arranged in a form of a matrix such that each GOA is disposed adjacent to and associated with a corresponding touch module. The plurality of GOAs is electrically coupled to each other in series as a chain such that the output of any one but the last GOA in the chain is connected to the input of its immediate next GOA in the chain, so that, in response to a start signal applied to the first GOA in the chain, sensing signals from successive corresponding touch modules are sequentially detected by a plurality of sensing devices.

18 Claims, 12 Drawing Sheets

TOUCH SENSING DEVICE HAVING A PLURALITY OF GATE DRIVERS ON ARRAY ADJACENT TO EACH OF A PLURALITY OF TOUCH MODULES

FIELD OF THE INVENTION

The present invention relates generally to a touch sensing device, and more particularly to a touch sensing device that utilizes a plurality of gate driver on array (GOA) circuits for driving and sensing a touch thereon, and method of driving same.

BACKGROUND OF THE INVENTION

Touch sensing technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, light emitting diode (LED) devices, plasma display panel (PDP) devices, computing devices, and the like, where a user may input desired information and/or operate the electronic system through a touch sensing device associated with the electronic system. A touch sensing device typically includes a touch panel which has a plurality of touch modules spatially arranged in the form of a matrix with a plurality of rows and a plurality of columns, a driving unit coupled to the touch panel via a plurality of driving lines, and a sensing unit coupled to the touch panel via a plurality of sensing lines.

FIG. 10 shows a conventional touch sensing device 10. The touch sensing device 10 includes a touch panel 11, a sensing unit 12, and a driving unit 15. As an illustrative example, the touch panel 11 has fifteen touch modules 11a arranged in the form of a matrix comprising three rows and five columns. The touch panel 11 is coupled to the driving unit 15 via three driving lines 14, with each driving line corresponding to a respective row of touch modules. The touch panel 11 is coupled to the sensing unit 12 via five sensing lines 13, each sensing line corresponding to a respective column of touch modules. The sensing unit 12 includes five sensing devices 12a, with each sensing device adapted for detecting a sensing signal in response to a driving pulse applied to a respective touch module 11a in a respective column. The driving unit 15 provides three trains of driving signals 16. Each train of driving signals 16 is applied to a respective driving line 14, and comprises five pulses, with each pulse for a respective touch module 11a in a corresponding row. The trains of driving signals 16 are delayed successively from row to row so that sensing signals from the touch modules are detected by the sensing devices in a row by row fashion to ensure correct determinations of sensing positions. FIG. 11 shows schematically a capacitive touch module 11a coupled with a driving line 14 and a sensing line 13. The driving line 14 and the sensing line 13 are coupled via a first capacitor 19. Referring to FIG. 11(A), when the touch module 11a is not touched, the touch module 11a is open. Referring to FIG. 11(B), when the touch module 11a is touched, the touch module 11a is coupled to the driving line 740 via a second capacitor 20. FIG. 12 shows a block diagram of the conventional touch sensing device 10 illustrated in FIG. 5. The driving unit 15 applies a driving signal 16 to a driving line 14 that is coupled to a sensing line 13 via a capacitor 19. A sensing signal is detected and transmitted, via the sensing line 14, to a comparator 17. The comparator 17 compares the sensing signal with a reference signal from a data buffer 18 to determine if the corresponding touch module has been touched or not.

The conventional touch sensing device illustrated in FIGS. 10-12 has the disadvantages that the number of driving signals provided by the driving unit is proportional to the number of rows in the touch panel. As the touch sensing technology continues to advance for higher and higher resolution, the number of driving signals required increases proportionally, and so does the complexity and the cost of the driving unit.

Therefore, a heretofore unaddressed need exists in the art to address the aforementioned deficiencies and inadequacies.

SUMMARY OF THE INVENTION

The present invention, in one aspect, relates to a touch sensing device. In one embodiment, the touch sensing device includes a plurality of touch modules spatially arranged in a form of a matrix having a plurality of rows and a plurality of columns.

The touch sensing device also has a plurality of primary gate driver on array circuits (GOAs) configured to receive a first clock signal. Each primary GOA has an input for receiving a first driving signal and an output for responsively outputting a delayed first driving signal by a first time interval to a respective touch module. The plurality of primary GOAs is spatially arranged in a form of a matrix such that each primary GOA is disposed adjacent to and associated with a respective touch module. The plurality of primary GOAs in each row is electrically coupled to each other in series such that the output of any one but the last primary GOA in a corresponding row is connected to the input of its immediate next primary GOA in the corresponding row, so that, in response to a driving signal applied to the input of the first primary GOA in the corresponding row, sensing signals from successive corresponding touch modules in the corresponding row are sequentially detected by a corresponding plurality of sensing devices.

The touch sensing device further has a plurality of secondary GOAs configured to receive a second clock signal. Each secondary GOA is electrically coupled to the first primary GOA in a respective row of the plurality of primary GOAs. Each secondary GOA has an input for receiving a second driving signal and an output for responsively outputting a delayed second driving signal by a second time interval to the first primary GOA in the respective row. The plurality of secondary GOAs is electrically coupled to each other in series such that the output of any one but the last secondary GOA is connected to the input of its immediate next secondary GOA, so that, in response to a start signal applied to the input of the first secondary GOA, sensing signals from successive rows of corresponding touch modules are sequentially detected by the plurality of sensing devices in a row by row fashion.

In one embodiment, each GOA of the plurality of primary GOAs and the plurality of secondary GOAs includes a shift register circuit.

In one embodiment, the first clock signal is characterized by a series of substantially periodic pulses with a first pulse width and a first period. The second clock signal is characterized by a series of substantially periodic pulses with a second pulse width and a second period. The second period of the second clock signal is greater than the first period of the first clock signal multiplied by the number of columns. In one embodiment, the first time interval is substantially equal to the first period of the first clock signal, and the second time interval is substantially equal to the second period of the second clock signal.

In one embodiment, the first driving signal is characterized by a pulse having a width substantially equal to the first pulse width of the first clock signal. The second driving signal is characterized by a pulse having a width substantially equal to the second pulse width of the second clock signal.

In another aspect, the present invention relates to a method of detecting sensing signals in a touch sensing device. The touch sensing device has a plurality of touch modules spatially arranged in a form of a matrix having a plurality of rows and a plurality of columns. In one embodiment, the method includes the step of providing a first clock signal to a plurality of primary GOAs. Each primary GOA has an input for receiving a first driving signal and an output for responsively outputting a delayed first driving signal by a first time interval to the corresponding touch module. The plurality of primary GOAs is spatially arranged in a form of a matrix such that each primary GOA is disposed adjacent to and associated with a corresponding touch module of the touch sensing device. The plurality of primary GOAs in each row is electrically coupled to each other in series such that the output of any one but the last primary GOA in a corresponding row is connected to the input of its immediate next primary GOA in the corresponding row, so that, in response to a driving signal applied to the input of the first primary GOA in the corresponding row, sensing signals from successive corresponding touch modules in the corresponding row are sequentially detected by a corresponding plurality of sensing devices.

The method also includes the step of providing a second clock signal to a plurality of secondary GOAs. Each secondary GOA is electrically coupled to the first primary GOA in a respective row of the plurality of primary GOAs, and has an input for receiving a second driving signal and an output for responsively outputting a delayed second driving signal by a second time interval to the first primary GOA in the respective row. The plurality of secondary GOAs is electrically coupled to each other in series such that the output of any one but the last secondary GOA is connected to the input of the its immediate next secondary GOA, so that, in response to a start signal applied to the input of the first secondary GOA, sensing signals from successive rows of corresponding touch modules are sequentially detected by the plurality of sensing devices in a row by row fashion.

In one embodiment, each GOA of the plurality of primary GOAs and the plurality of secondary GOAs comprises a shift register circuit.

In one embodiment, the first clock signal is characterized by a series of substantially periodic pulses with a first pulse width and a first period. The second clock signal is characterized by a series of substantially periodic pulses with a second pulse width and a second period, where the second period of the second clock signal is greater than the first period of the first clock signal multiplied by the number of columns. The first time interval is substantially equal to the first period of the first clock signal, and the second time interval is substantially equal to the second period of the second clock signal.

In one embodiment, the first driving signal is characterized by a pulse having a width substantially equal to the first pulse width of the first clock signal, and the second driving signal is characterized by a pulse having a width substantially equal to the second pulse width of the second clock signal.

In yet another aspect, the present invention relates to a touch sensing device. In one embodiment, the touch sensing device includes a plurality of touch modules spatially arranged in a form of a matrix having a plurality of rows and a plurality of columns, and a plurality of GOAs configured to receive a clock signal. Each GOA has an input for receiving a driving signal and an output for responsively outputting a delayed driving signal by a time interval to a respective touch module. The plurality of GOAs is spatially arranged in a form of a matrix such that each GOA is disposed adjacent to and associated with a corresponding touch module. The plurality of GOAs is electrically coupled to each other in series as a chain such that the output of any one but the last GOA in the chain is connected to the input of its immediate next GOA in the chain, so that, in response to a start signal applied to the first GOA in the chain, sensing signals from successive corresponding touch modules are sequentially detected by a plurality of sensing devices.

In one embodiment, each of the plurality of GOAs comprises a shift register circuit.

In one embodiment, the clock signal is characterized by a series of substantially periodic pulses with a pulse width and a period. The time interval is substantially equal to the period of the clock signal. The driving signal is characterized by a pulse having a width substantially equal to the pulse width of the clock signal.

In a further aspect, the present invention relates to a method of detecting sensing signals in a touch sensing device. The touch sensing device has a plurality of touch modules spatially arranged in a form of a matrix having a plurality of rows and a plurality of columns. In one embodiment, the method comprising the step of providing a clock signal to a plurality of GOAs spatially arranged in a form of a matrix such that each GOA is disposed adjacent to and associated with a corresponding touch module of the touch sensing device. Each GOA has an input for receiving a driving signal and an output for responsively outputting a delayed driving signal by a time interval to the corresponding touch module. The plurality of GOAs is electrically coupled to each other in series as a chain such that the output of any one but the last GOA in the chain is connected to the input of its immediate next GOA in the chain, so that, in response to a start signal applied to the first GOA in the chain, sensing signals from successive corresponding touch modules are sequentially detected by a plurality of sensing devices.

In one embodiment, each of the plurality of GOAs comprises a shift register circuit.

In one embodiment, the clock signal is characterized by a series of substantially periodic pulses with a pulse width and a period. The time interval is substantially equal to the period of the clock signal. The driving signal is characterized by a pulse having a width substantially equal to the pulse width of the clock signal.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
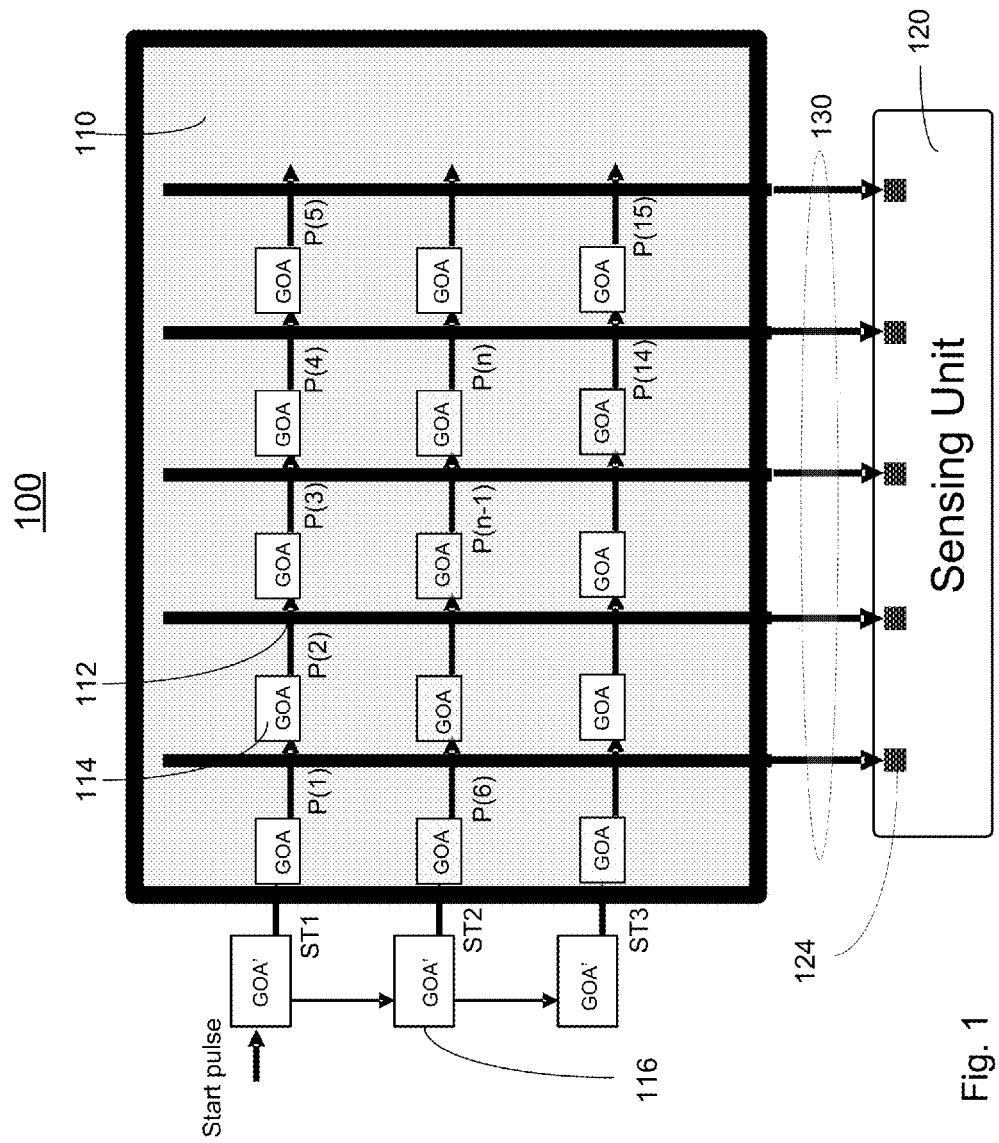
FIG. 1 shows schematically a touch sensing device according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "gate driver on array" or its acronym "GOA" refers to a fabricating layout or architecture of a shift register and/or a gate driver and/or a driving circuit on a glass substrate of a display/touch panel, with amorphous silicon (a-Si) thin film transistors (TFTs), and/or low temperature polycrystalline silicon (LTPS) TFTs.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings in FIGS. 1-9. In accordance with the purposes of this invention, as embodied and broadly described herein, this invention, in one aspect, relates to a touch sensing device that utilizes a plurality of GOAs for driving and sensing.

Referring to FIG. 1, a touch sensing device 100 is schematically shown according to one embodiment of the present invention. The touch sensing device 100 includes a touch panel 110, a plurality of touch modules 112 spatially arranged in a matrix form in the touch panel 110, a plurality of primary GOAs 114 with each disposed adjacent to and associated with a respective touch module 112, and a plurality of secondary GOAs 116 with each electrically coupled to the first primary GOA 114 in a respective row of the plurality of primary GOAs 114.

The plurality of primary GOAs 114 in each row is electrically coupled to each other in series such that the output of any one but the last primary GOA 114 in a corresponding row is connected to the input of its immediate next primary GOA 114 in the corresponding row. Each primary GOA 114 is adapted for receiving a first driving signal from its input, delaying the first driving signal by a first time interval therein, and outputting the delayed first driving signal from its output to a respective touch module. In operation, a driving signal is applied to the input of the first primary GOA 114 in a row, sensing signals from successive touch modules 114 in the corresponding row are sequentially detected by a corresponding plurality of sensing devices.

The plurality of secondary GOAs 116 is electrically coupled to each other in series such that the output of any one but the last secondary GOA 116 is connected to the input of its immediate next secondary GOA 116. Each secondary GOA is adapted for receiving a second driving signal from its input, delaying the second driving signal by a second time interval therein, and outputting the delayed second driving signal from its output. In operation, a start signal is applied to the input of the first secondary GOA, sensing signals from successive rows of corresponding touch modules 112 are sequentially detected by the plurality of sensing devices in a row by row fashion.

As an illustrative example shown in FIG. 1, the touch sensing device 100 has fifteen touch modules 112 arranged in three rows and five columns in the touch panel 110, fifteen primary GOAs 114 spatially arranged according to the matrix in which each primary GOA 114 is disposed adjacent to and associated with a respective touch module 112, and three secondary GOAs 116, each of which is electrically coupled to the first primary GOA 114 in a respective row of primary GOAs 114. The touch modules 112, the primary GOAs 114 and the secondary GOAs 116 are coupled to a sensing unit 120 which has five sensing devices 124 via five sensing lines 130. Each sensing device 124 is adapted for detecting a sensing signal in response to a driving signal applied to a respective touch module 112 in a respective column.

The fifteen primary GOAs 114 are configured to receive a first clock signal, CK1, from a timing controller (not shown).

Each primary GOA 114 has an input for receiving a first driving signal, an output for outputting, in response to the first clock signal CK1, a delayed first driving signal by a first time interval, $t_1$, to a respective touch module. The five primary GOAs 114 in each row are electrically coupled to each other in series such that the output of any one but the last primary GOA in a corresponding row is connected to the input of its immediate next primary GOA in the corresponding row.

The three secondary GOAs 116 are configured to receive a second clock signal, CK2, from the timing controller. Each secondary GOA 116 has an input for receiving a second driving signal, an output for outputting, in response to the second clock signal CK2, a delayed second driving signal by a second time interval, $t_2$, to the first primary GOA 114 in a respective row. The three secondary GOAs 116 are electrically coupled to each other in series such that the output of any one but the last secondary GOA is connected to the input of its immediate next secondary GOA 116.

Figure 2:
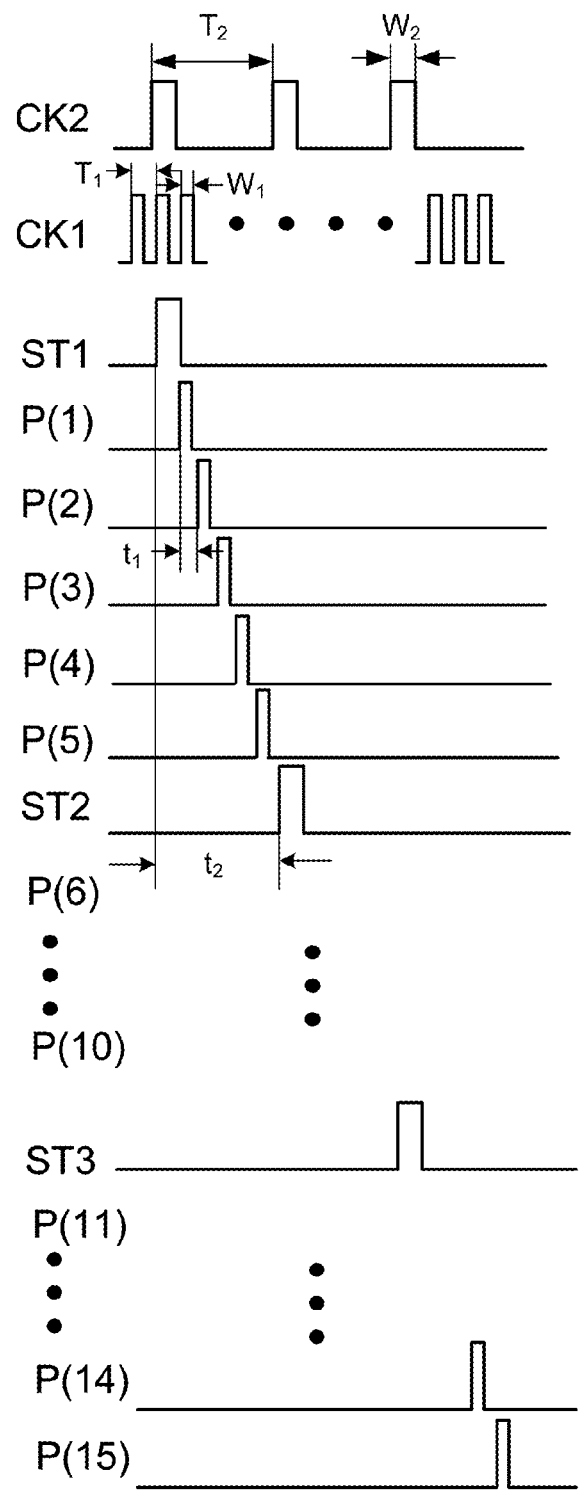
FIG. 2 shows schematically the time charts of first and second clock signals (CK1 and CK2), the plurality of first driving signals [p(1)-p(15)] and the plurality of second driving signals (ST1-ST3) for the touch sensing device shown in FIG. 1, according to one embodiment of the present invention.

FIG. 2 shows schematically the time charts of the first clock signal CK1, the second clock signal CK2, the plurality of second driving signals ST1-ST3 and the plurality of first driving signals p(1)-p(15) for driving the touch sensing device 100, according to one embodiment of the present invention. The first clock signal CK1 is characterized by a series of substantially periodic pulses with a first pulse width, $W_1$, and a first period, $T_1$. The second clock signal CK2 is characterized by a series of substantially periodic pulses with a second pulse width, $W_2$, and a second period, $T_2$. The second period $T_2$ is greater than the first period $T_1$ multiplied by the number of columns (which is equal to 5 in this example). In one embodiment, each of the plurality of first driving signals p(1)-p(15) is characterized by a pulse having a width substantially equal to the first pulse width $W_1$ of the first clock signal CK1, and each of the plurality of second driving signals ST1-ST3 is characterized by a pulse having a width substantially equal to the second pulse width $W_2$ of the second clock signal CK2.

In response to a start signal applied to the first secondary GOA 116, the first secondary GOA 116 outputs a driving signal ST1, which is applied to both the input of the first primary GOA 114 in the first row and the input of the second secondary GOA 116. The first primary GOA 114 in the first row, in response to the first clock signal CK1, outputs a first driving signal p(1), which is applied to both the corresponding touch module 112 and the input of the second primary GOA 114 in the first row. In response to the first driving signal p(1), the sensing signal from the corresponding touch module 112 is detected by the first sensing device 124 of the sensing unit 120. The second primary GOA 114 in the first row, in response to the first clock signal CK1, outputs a delayed first driving signal p(2) by a first time interval ($t_1$) with respect to p(1). In one embodiment, the first time interval $t_1$ is substantially equal to the first period $T_1$ of the first clock signal CK1. The first driving signal p(2) is applied to both the corresponding touch module 112 and to the input of the third primary GOA 114 in the first row. In response to the first driving signal p(2), the sensing signal from the corresponding touch module 112 is detected by the second sensing device 124. This process continues in similar fashion until the sensing signals from all touch modules 112 in the first row are sequentially detected by the corresponding sensing devices 124.

Subsequently, in response to the second clock signal CK2, the second secondary GOA 116 outputs a delayed second driving signal ST2 by a second time interval $t_2$ with respect to ST1. In one embodiment, the second time interval $t_2$ is substantially equal to the second period $T_2$ of the second clock signal CK2. The driving signal ST2 is applied to both the input of the first primary GOA 114 in the second row and the input of the third secondary GOA 116. The condition that the second period $T_2$ is greater than the first period $T_1$ multiplied by the number of columns ensures that ST2 is applied to the first primary GOA 114 in the second row after the sensing signals from all touch modules 112 in the first row have been detected by the corresponding plurality of sensing devices 124. In response to the first clock signal CK1, the first primary GOA 114 in the second row outputs a first driving signal p(6), which is applied to both the corresponding touch module 112 and to the input of the second primary GOA 114 in the second row. In response to the first driving signal p(6), the sensing signal from the corresponding touch module 112 is detected by the first sensing device 124. This process continues until the sensing signals from all touch modules 112 in the second row are sequentially detected by the corresponding sensing devices 124. Then the process starts again for the third row, and so on and so forth, until sensing signals from all touch modules 112 in the touch panel 110 are detected by the corresponding sensing devices 124.

Figure 3:
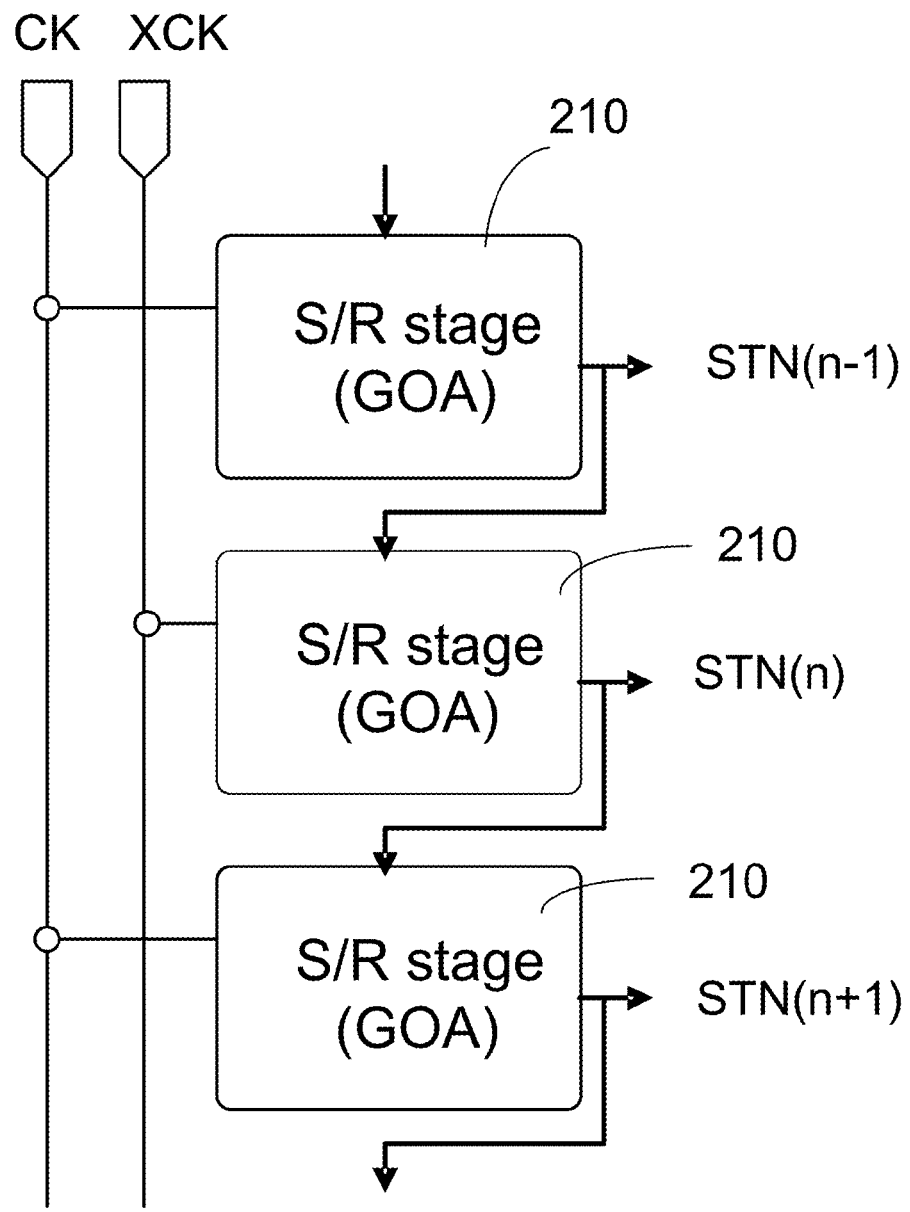
FIG. 3 shows schematically a plurality of GOAs electrically coupled to each other in series according to one embodiment of the present invention.
Figure 4:
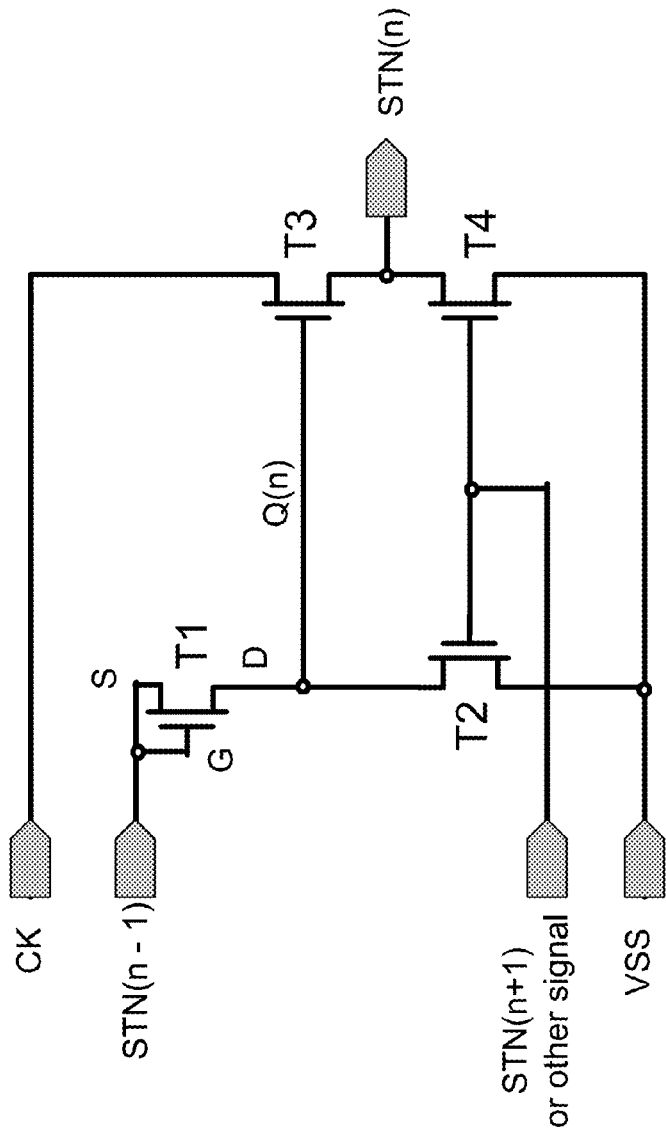
FIG. 4 shows a schematic circuit diagram of a GOA according to one embodiment of the present invention.
Figure 5:
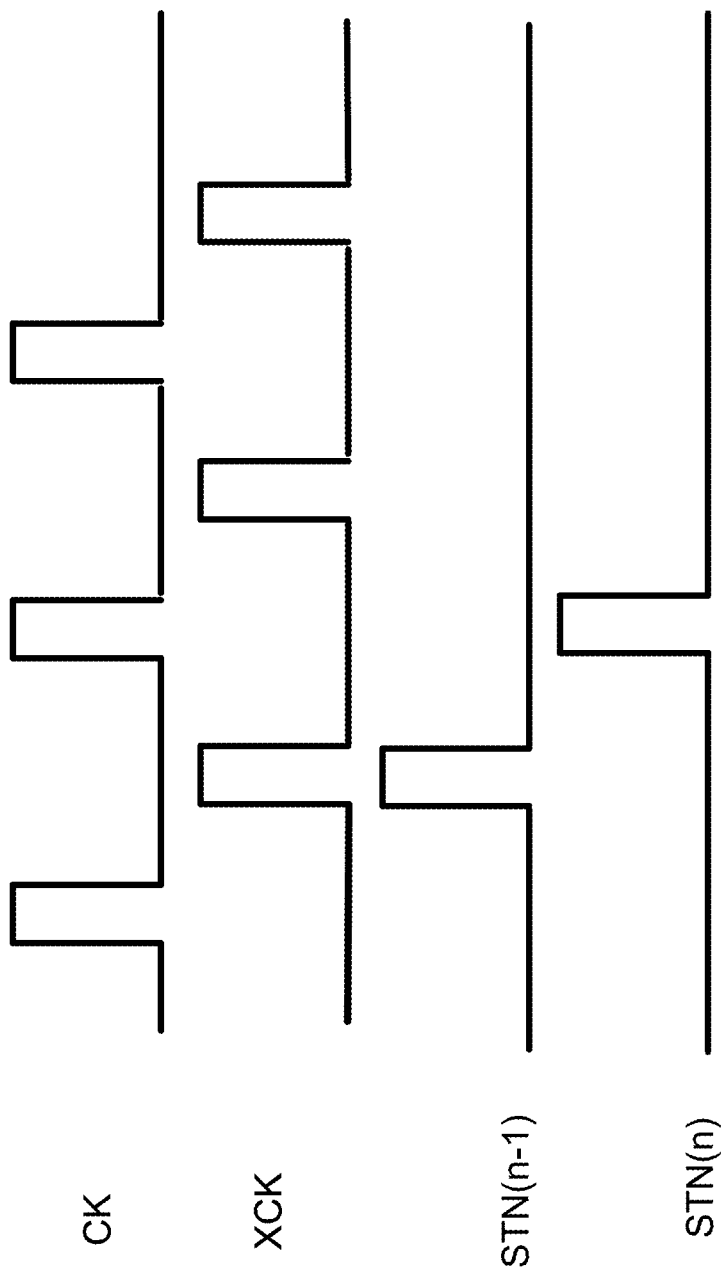
FIG. 5 shows schematically the time charts of the clock signals (CK and XCK) and the input and output signals [STN(n−1) and STN(n), respectively] for the GOA shown in FIG. 4, according one embodiment of the present invention.

Referring to FIG. 3, one embodiment of a plurality of GOAs 210 is schematically shown according to the present invention. The plurality of GOAs is electrically coupled to each other and adapted for sequentially shifting a driving pulse/signal. In one embodiment, the odd numbered GOAs are configured to receive a first clock signal, CK, and the even numbered GOAs are configured to receive a second clock signal, XCK, that is phase shifted by about 180° with respect to the first clock signal CK. Each GOA 210 corresponds to a shift register (S/R) stage/circuit, as shown in FIG. 4. The GOA 210 comprises four transistors T1-T4. Each transistor has a gate terminal, G, a source terminal, S, and a drain terminal, D. The gate terminal and the source terminal of T1 are tied together and serve as the input terminal of the GOA. The drain terminals of T3 and T4 are tied together and serve as the output terminal of the GOA 210. The source terminal of T3 receives a clock signal, CK or XCK. The source terminal of T4 is connected to a voltage source Vss. An output signal STN(n−1) from an immediate previous GOA 210 in the series is applied to the input terminal of the GOA 210. The GOA 210 outputs a delayed signal STN(n) at its output terminal. FIG. 5 shows schematically the time charts of the clock signals CK and XCK and the input and output signals, STN(n−1) and STN(n), respectively, for the GOA 210 shown in FIG. 4. Clock signal CK is applied to odd numbered GOAs in the series, and clock signal XCK, which is phased shifted by about 180° with respect to CK, is applied to even numbered GOAs in the series. Each GOA outputs a delayed signal STN(n) by a time interval with respect to the input signal STN(n−1). In one embodiment, the time interval is about one half of a period of the clock signal CK or XCK.

Figure 6:
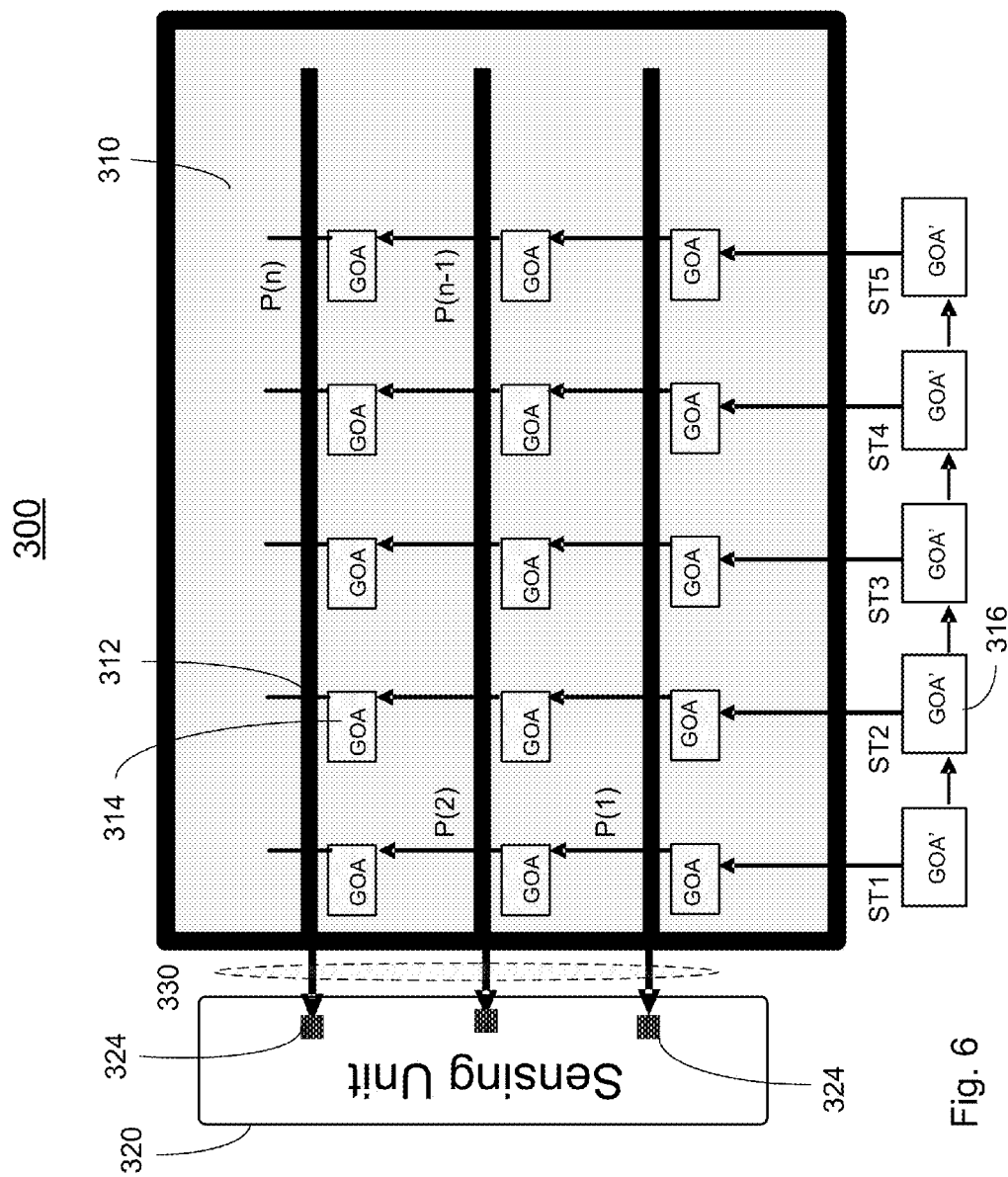
FIG. 6 shows schematically a touch sensing device according to one embodiment of the present invention.

FIG. 6 shows schematically a touch sensing device 300 according to another embodiment of the present invention. Similar to the touch sensing device 100 shown in FIG. 1, the touch panel 310 has a touch panel 310, fifteen touch modules 312 arranged in the form of a matrix in three rows and five columns. The touch sensing device 300 also has fifteen primary GOAs 314 spatially arranged in accordance with the matrix such that each primary GOA 314 is disposed adjacent to and associated with a respective touch module 312. The touch sensing device 300 further has five secondary GOAs 316 with each electrically coupled to the first primary GOA 314 in a respective column of primary GOAs 314. The touch modules 312, the primary GOAs 314 and the secondary GOAs 316 are coupled to a sensing unit 320 with three sensing devices 324 via three sensing lines 330. Each sensing device 324 is adapted for detecting a sensing signal in response to a driving signal applied to a respective touch module 312 in a respective row. The three primary GOAs 314 in each column are electrically coupled to each other in series such that the output of any one but the last primary GOA 314 in a corresponding column is connected to the input of its immediate next primary GOA 314 in the corresponding column. The five secondary GOAs 316 are electrically coupled to each other in series such that the output of any one but the last secondary GOA 316 is connected to the input of its immediate next secondary GOA 316.

Figure 7:
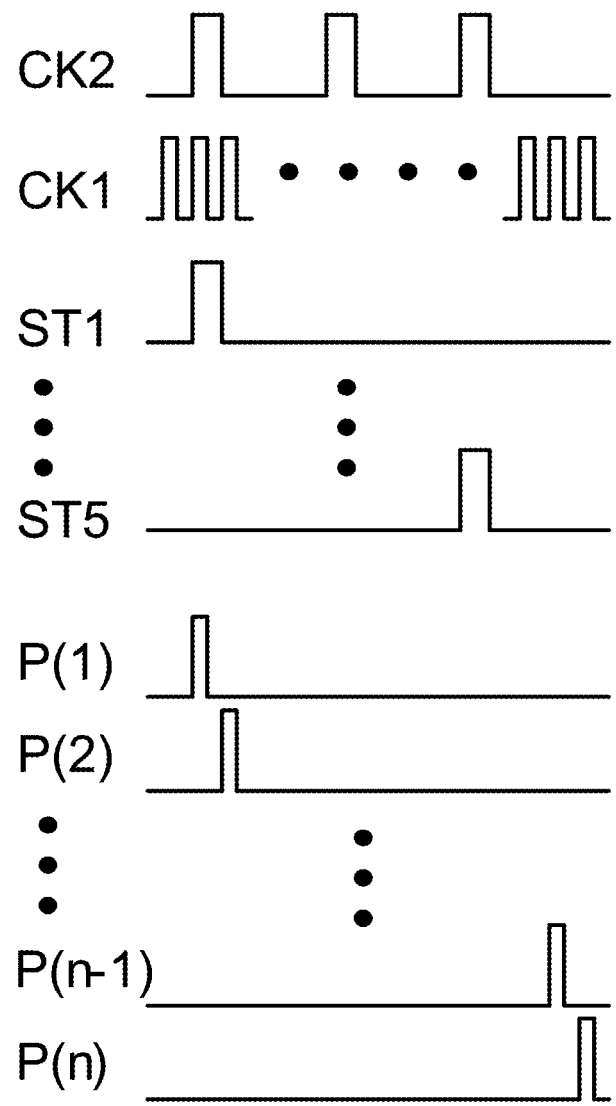
FIG. 7 shows schematically the time charts of the first and second clock signals (CK1 and CK2), the plurality of first driving signals [p(1)-p(15)] and the plurality of second driving signals (ST1-ST5) for the touch sensing device shown in FIG. 6, according to one embodiment of the present invention.

The method of detecting sensing signals in the touch sensing device 300 shown in FIG. 6 is similar to that described above in relation to the touch sensing device 100 shown in FIG. 1, except that the sensing direction and the driving direction are switched. FIG. 7 shows schematically the time charts of the first and second clock signals CK1 and CK2, the plurality of second driving signals ST1-ST5, and the plurality of first driving signals p(1)-p(15), according to one embodiment of the present invention.

Figure 8:
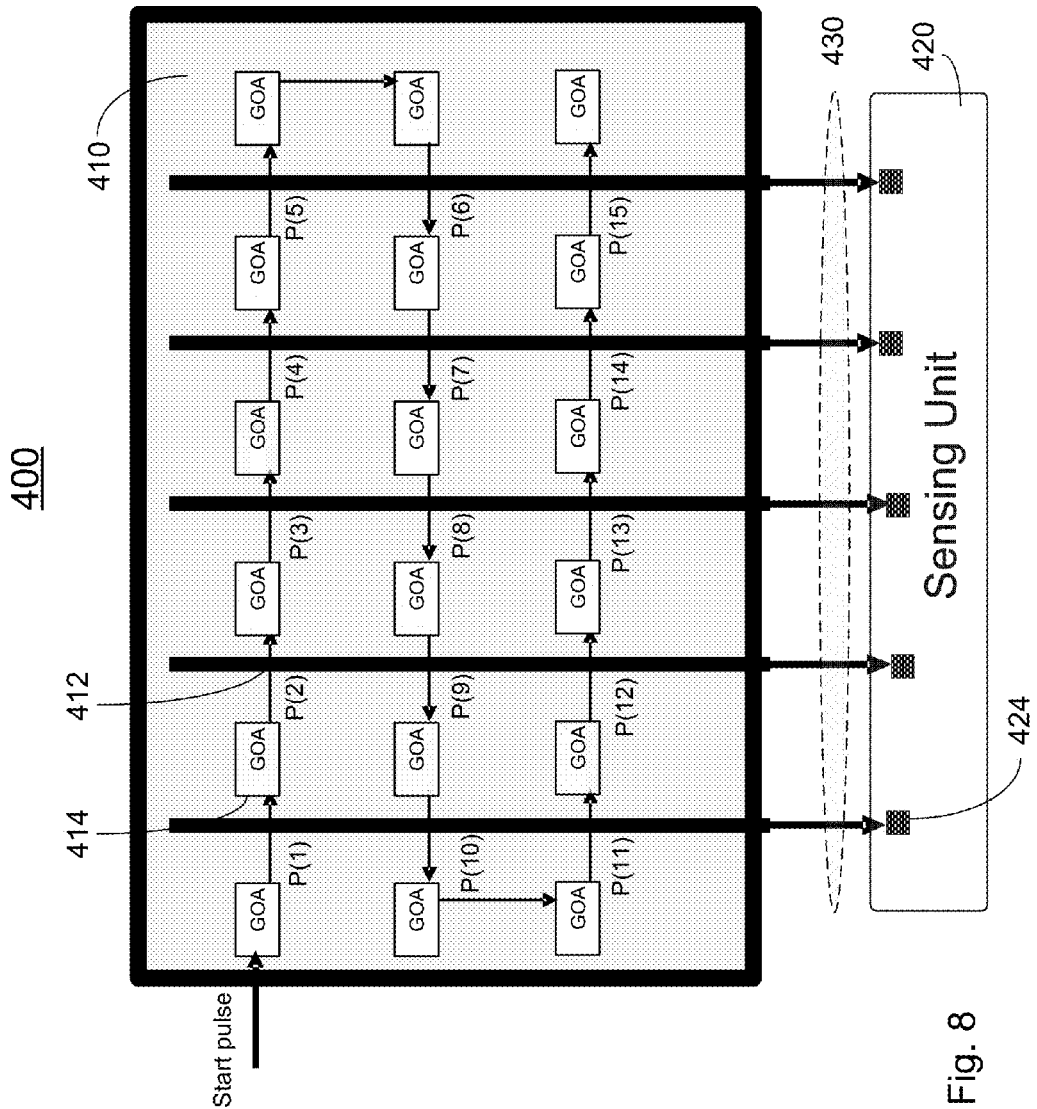
FIG. 8 shows schematically a touch sensing device according to one embodiment of the present invention.

Referring now to FIG. 8, a touch sensing device 400 is schematically shown according to yet another embodiment of the present invention. In this exemplary embodiment, the touch sensing device 400 has a touch panel 410 and fifteen touch modules 412 arranged in the touch panel in the form of a touch module matrix having three rows and five columns. The touch panel 410 is corresponding to an active touch sensing area of the touch sensing device 400. The touch sensing device 400 also has eighteen GOAs 414 spatially arranged in the touch panel in a form of a GOA matrix according to the touch module matrix such that each primary GOA 414 is disposed adjacent to and associated with a respective touch module 412. The touch modules 412 and the GOAs 414 are coupled to a sensing unit 420 that has five sensing devices 424 via five sensing lines 430. Each sensing device 424 is adapted for detecting a sensing signal in response to a driving signal applied to a respective touch module 412 in a respective column. The plurality of GOAs 414 is configured to receive a clock signal, CK, from a timing controller (not shown). Each GOA 414 has an input for receiving a driving signal and an output for outputting, in response to the clock signal CK, a delayed driving signal by a time interval to a respective touch module 412. The plurality of GOAs 414 are electrically coupled to each other in series as a chain such that the output of any one but the last GOA 414 in the chain is connected to the input of its immediately next GOA 414 in the chain. In this exemplary embodiment shown in FIG. 8, the GOA matrix has three rows and six columns. Each row of the GOA matrix is located in the touch panel 410 corresponding to a respective row of the touch module matrix, while each column of the GOA matrix is located in the touch panel 410 corresponding to a respective column of the touch module matrix. In addition, as shown in FIG. 8, in each odd (e.g., first and third) row of the GOA matrix, the output of a GOA in the j-th column is connected to the input of a GOA in the (j+1)-th column, where j=1, 2, 3, . . . , 5. In each even (e.g., second) row of the GOA matrix, the output of a GOA in the (j+1)-th column is connected to the input of a GOA in the j-th column. In the first column, the input of the first GOA in the first row is connected to the start pulse, the output of the GOA in the second row is connected to the input of the GOA in the third row, while, in the 6-th column, the output of the GOA in the first row is connected to the input of the GOA in the second row. Accordingly, the start pulse transmits along the GOA chain from the first column GOA through the 6-th column GOA of the first row of the GOA matrix, and to the 6-th column GOA through the first column GOA of the second row of the GOA matrix, and to the first column GOA through the 6-th column GOA of the third row of the GOA matrix.

Figure 9:
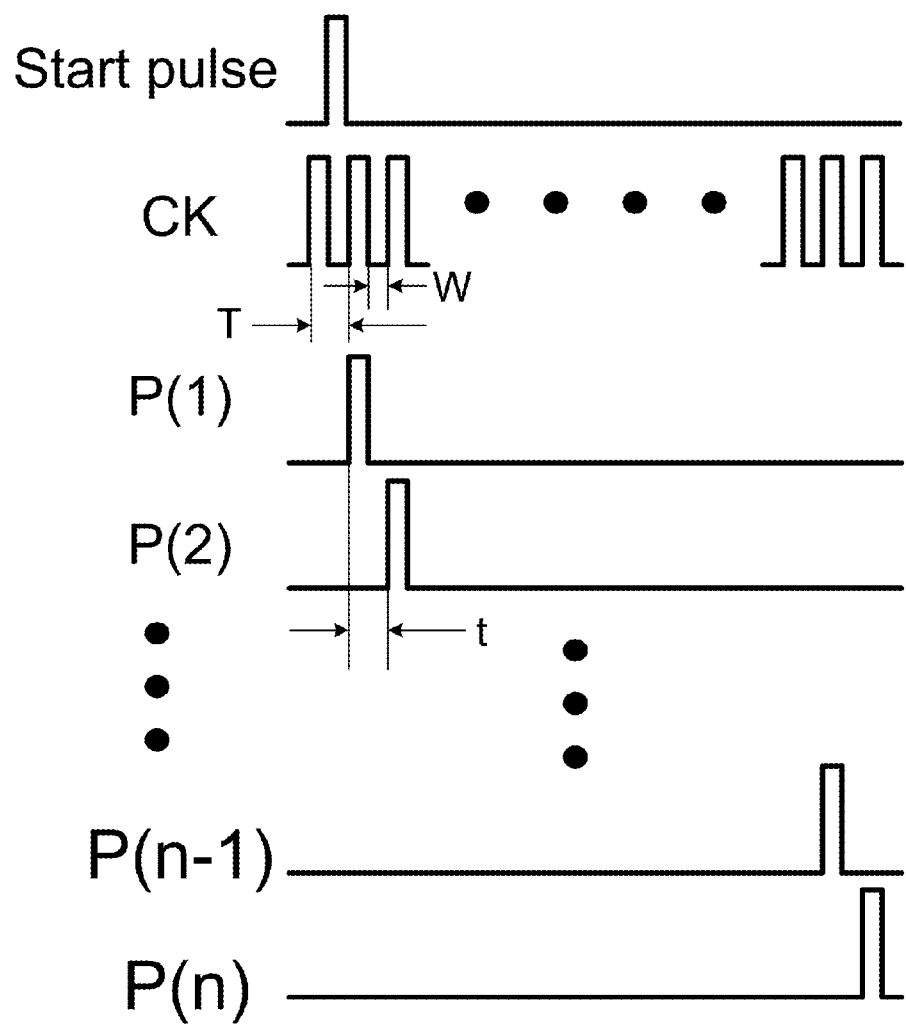
FIG. 9 shows schematically the time charts of the clock signal (CK) and the plurality of driving signals [p(1)-p(18)] for the touch sensing device shown in FIG. 8 according to one embodiment of the present invention.
Figure 10:
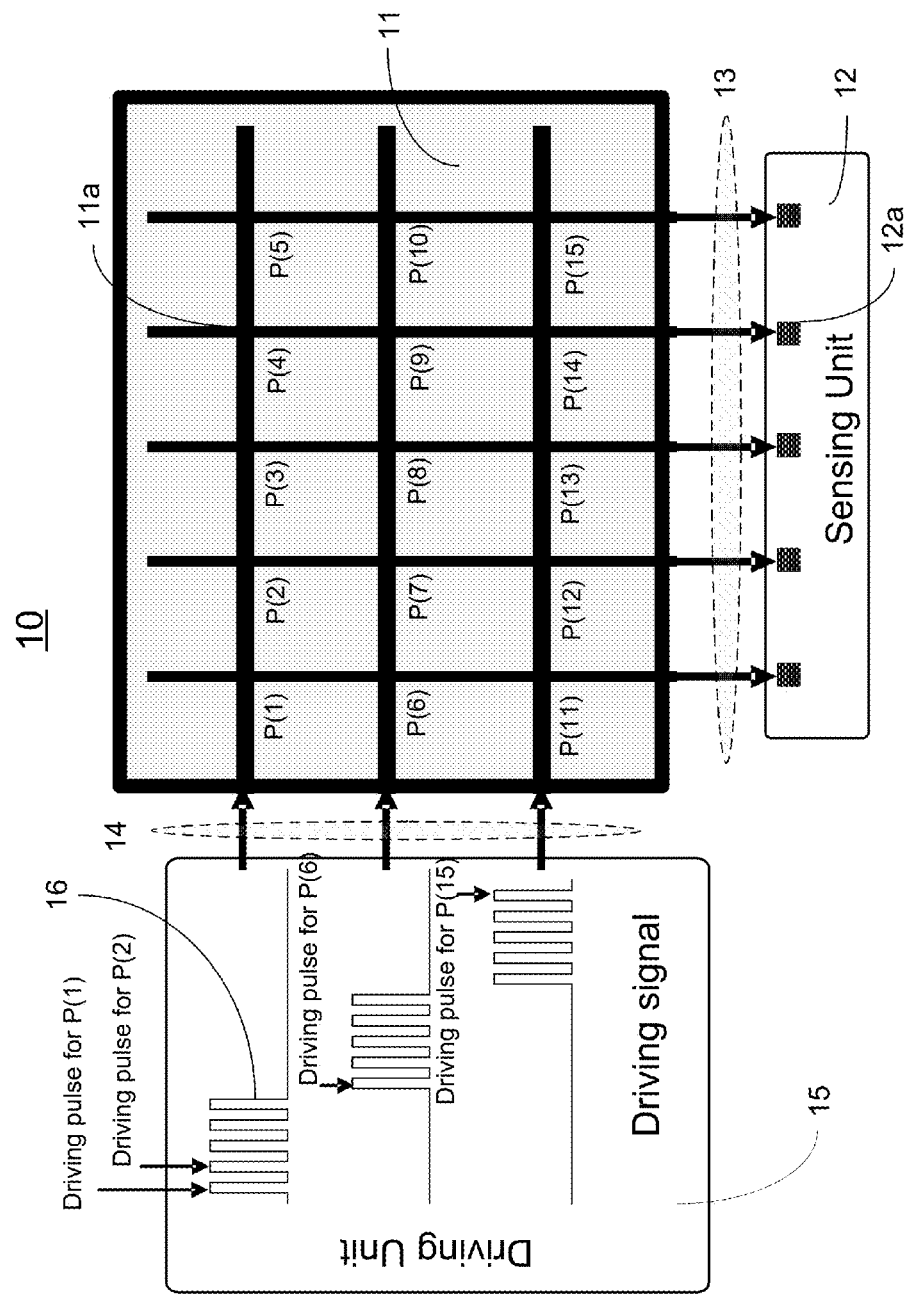
FIG. 10 shows schematically a conventional touch sensing device.
Figure 11:
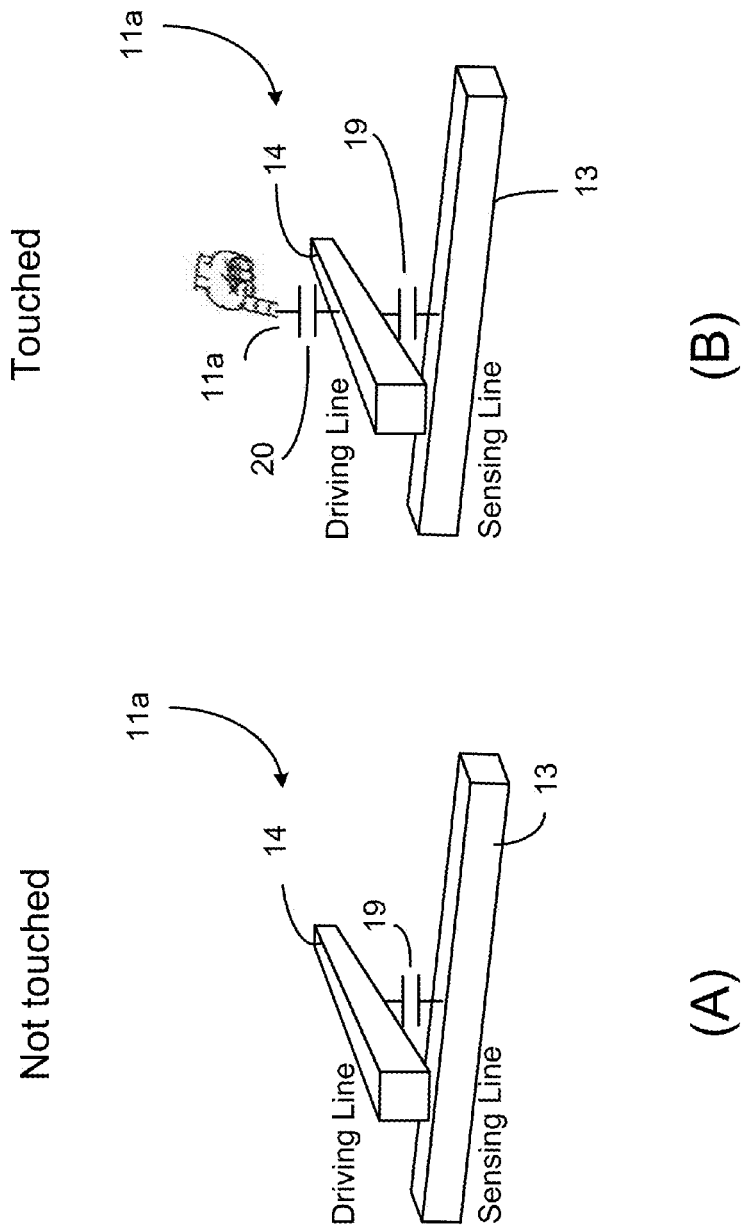
FIG. 11 shows schematically a conventional touch sensing device that is not touched (A) and touched (B), respectively.
Figure 12:
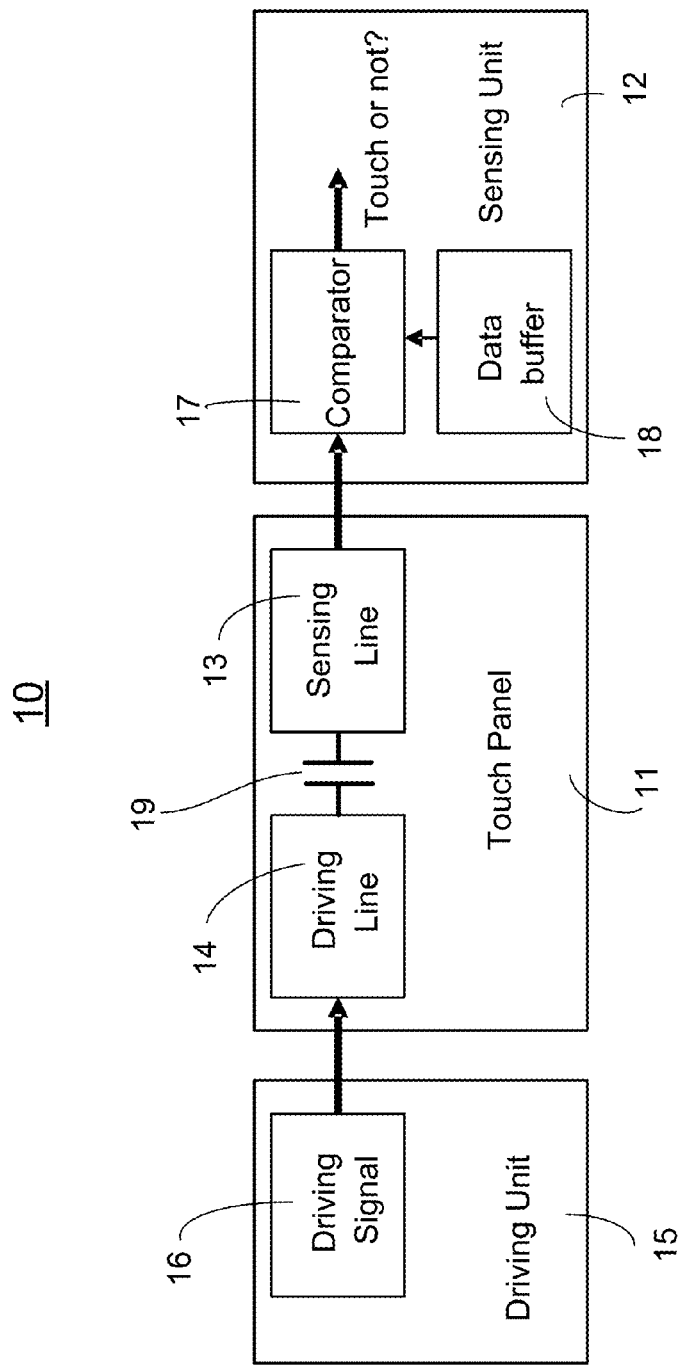
FIG. 12 shows a block diagram of a conventional touch sensing device.

FIG. 9 shows schematically the time charts of the clock signal CK and the plurality of driving signals p(1)-p(15) according to one embodiment of the present invention. The clock signal CK is characterized by a series of substantially periodic pulses with a pulse width, W, and a period, T. In response to a start signal applied to the first GOA 414 in the chain, the first GOA 414 outputs a driving signal p(1), which is applied to both the corresponding touch module 412 and the input of the second GOA 414 in the chain. In response to the driving signal p(1), the sensing signal from the corresponding touch module 412 is detected by the first sensing device 424. The second GOA 414 in the chain, in response to the clock signal CK, outputs a delayed driving signal p(2) by a time interval, t, with respect to p(1). In one embodiment, the time interval (t) is substantially equal to the period T of the clock signal CK. The driving signal p(2) is applied to both the corresponding touch module 412 and to the input of the third GOA 414 in the chain. In response to the driving signal p(2), the sensing signal from the corresponding touch module 412 is detected by the second sensing device 424. This process continues in the same fashion along the chain until the sensing signals from all touch modules 412 in the touch panel 410 are sequentially detected by the corresponding plurality of sensing devices 424. In this embodiment, only primary GOAs are needed. The correspondence between the sensing sequence and the sensing devices needs to be properly arranged to ensure correct determinations of sensing positions.

The touch panel illustrated in some embodiments of the present invention has the advantage that a timing controller controls the detection of sensing signals via one or two clock signals and the need for a separate driving unit is eliminated. Therefore, the cost of an increasingly complex driving unit for a touch panel with increasingly higher resolution is avoided.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A touch sensing device having a touch panel, comprising:
    (a) a plurality of touch modules spatially arranged in the touch panel in a form of a touch module matrix having a plurality of rows and a plurality of columns;
    (b) a plurality of primary gate driver on array circuits (GOAs) configured to receive a first clock signal, spatially arranged in the touch panel in a form of a GOA matrix located corresponding to the touch module matrix such that each primary GOA is disposed adjacent to and associated with a respective touch module, each primary GOA having an input for receiving a first driving signal and an output for responsively outputting a delayed first driving signal by a first time interval to a respective touch module, wherein the plurality of primary GOAs in each row is electrically coupled to each other in series such that the output of any one but the last primary GOA in a corresponding row is connected to the input of its immediate next primary GOA in the corresponding row, so that, in response to a driving signal applied to the input of the first primary GOA in the corresponding row, sensing signals from successive corresponding touch modules in the corresponding row are detected by a corresponding plurality of sensing devices;

(c) a plurality of secondary GOAs configured to receive a second clock signal, spatially arranged in the touch panel in the form of the GOA matrix located corresponding to the touch module matrix such that each secondary GOA is disposed adjacent to and associated with the respective touch module, each secondary GOA electrically coupled to a first primary GOA in a respective row of the plurality of primary GOAs, and having an input for receiving a second driving signal and an output for responsively outputting a delayed second driving signal by a second time interval to the first primary GOA in the respective row, wherein the plurality of secondary GOAs is electrically coupled to each other in series such that the output of any one but the last secondary GOA is connected to the input of its immediate next secondary GOA, so that, in response to a start signal applied to the input of a first secondary GOA, sensing signals from successive rows of corresponding touch modules are detected by the plurality of sensing devices in a row by row fashion.

2. The touch sensing device of claim 1, wherein each GOA of the plurality of primary GOAs and the plurality of secondary GOAs comprises a shift register circuit.

3. The touch sensing device of claim 1, wherein the first clock signal is characterized by a series of substantially periodic pulses with a first pulse width and a first period, wherein the second clock signal is characterized by a series of substantially periodic pulses with a second pulse width and a second period, and wherein the second period of the second clock signal is greater than the first period of the first clock signal multiplied by the number of columns.

4. The touch sensing device of claim 3, wherein the first driving signal is characterized by a pulse having a width substantially equal to the first pulse width of the first clock signal, and the second driving signal is characterized by a pulse having a width substantially equal to the second pulse width of the second clock signal.

5. The touch sensing device of claim 4, wherein the first time interval is substantially equal to the first period of the first clock signal, and the second time interval is substantially equal to the second period of the second clock signal.

6. A method of detecting sensing signals in a touch sensing device having a touch panel, the touch sensing device comprising a plurality of touch modules spatially arranged in the touch panel in a form of a touch module matrix having a plurality of rows and a plurality of columns, the method comprising the steps of:

(a) providing a first clock signal to a plurality of primary gate driver on array circuits (GOAs) spatially arranged in the touch panel in a form of a GOA matrix located corresponding to the touch module matrix such that each primary GOA is disposed adjacent to and associated with a corresponding touch module of the touch sensing device, each primary GOA having an input for receiving a first driving signal and an output for responsively outputting a delayed first driving signal by a first time interval to the corresponding touch module, wherein the plurality of primary GOAs in each row is electrically coupled to each other in series such that the output of any one but the last primary GOA in a corresponding row is connected to the input of its immediate next primary GOA in the corresponding row, so that, in response to a driving signal applied to the input of a first primary GOA in the corresponding row, sensing signals from successive corresponding touch modules in the corresponding row are detected by a corresponding plurality of sensing devices; and (b) providing a second clock signal to a plurality of secondary GOAs spatially arranged in the touch panel in the GOA matrix located corresponding to the touch module matrix such that each secondary GOA is disposed adjacent to and associated with the corresponding touch module of the touch sensing device, each secondary GOA being electrically coupled to the first primary GOA in a respective row of the plurality of primary GOAs, and having an input for receiving a second driving signal and an output for responsively outputting a delayed second driving signal by a second time interval to the first primary GOA in the respective row, wherein the plurality of secondary GOAs is electrically coupled to each other in series such that the output of any one but the last secondary GOA is connected to the input of the its immediate next secondary GOA, so that, in response to a start signal applied to the input of a first secondary GOA, sensing signals from successive rows of corresponding touch modules are detected by the plurality of sensing devices in a row by row fashion.

7. The method of claim 6, wherein each GOA of the plurality of primary GOAs and the plurality of secondary GOAs comprises a shift register circuit.

8. The method of claim 6, wherein the first clock signal is characterized by a series of substantially periodic pulses with a first pulse width and a first period, wherein the second clock signal is characterized by a series of substantially periodic pulses with a second pulse width and a second period, and wherein the second period of the second clock signal is greater than the first period of the first clock signal multiplied by the number of columns.

9. The method of claim 8, wherein the first driving signal is characterized by a pulse having a width substantially equal to the first pulse width of the first clock signal, and the second driving signal is characterized by a pulse having a width substantially equal to the second pulse width of the second clock signal.

10. The method of claim 9, wherein the first time interval is substantially equal to the first period of the first clock signal, and the second time interval is substantially equal to the second period of the second clock signal.

11. A touch sensing device having a touch panel, comprising:

(a) a plurality of touch modules spatially arranged in the touch panel in a form of a touch module matrix having a plurality of rows and a plurality of columns; and (b) a plurality of gate driver on array circuits (GOAs) configured to receive a clock signal, spatially arranged in the touch panel in a form of a GOA matrix located corresponding to the touch module matrix such that each GOA is disposed adjacent to and associated with a corresponding touch module, each GOA having an input for receiving a driving signal and an output for responsively outputting a delayed driving signal by a time interval to a respective touch module, wherein the plurality of GOAs is electrically coupled to each other in series as a chain such that the output of any one but the last GOA in the chain is connected to the input of its immediate next GOA in the chain, so that, in response to a start signal applied to a first GOA in the chain, sensing signals from successive corresponding touch modules are detected by a plurality of sensing devices.

12. The touch sensing device of claim 11, wherein each of the plurality of GOAs comprises a shift register circuit.

13. The touch sensing device of claim 11, wherein the clock signal is characterized by a series of substantially periodic pulses with a pulse width and a period.

14. The touch sensing device of claim 13, wherein the driving signal is characterized by a pulse having a width substantially equal to the pulse width of the clock signal.

15. The touch sensing device of claim 14, wherein the time interval is substantially equal to the period of the clock signal.

16. The touch sensing device of claim 11, wherein the GOA matrix has a plurality of rows and a plurality of columns, and wherein each row of the GOA matrix is located in the touch panel corresponding to a respective row of the touch module matrix, and each column of the GOA matrix is located in the touch panel corresponding to a respective column of the touch module matrix.

17. The touch sensing device of claim 16, wherein
in each odd row of the GOA matrix, the output of a GOA in the j-th column is connected to the input of a GOA in the (j+1)-th column, j=1, 2, 3, . . . , (M−1), M being the column number of the GOA matrix;
in each even row of the GOA matrix, the output of a GOA in the (j+1)-th column is connected to the input of a GOA in the j-th column;
in the first column, the input of a GOA in the first row is connected to the clock signal, the output of a GOA in the (i+1)-th row is connected to the input of a GOA in the (i+2)-th row, i being an odd integer; and
in the M-th column, the output of a GOA in the i-th row is connected to the input of a GOA in the (i+1)-th row.

18. The touch sensing device of claim 17, wherein the start signal transmits along the GOA chain from the first column GOA through the M-th column GOA of the first row of the GOA matrix, and to the M-th column GOA through the first column GOA of the second row of the GOA matrix, and to the first column GOA through the M-th column GOA of the third row of the GOA matrix, . . . , and to one of the first column GOA and the M-th column GOA through the other of the first column GOA and the M-th column GOA of the last row of the GOA matrix.

* * * * *